US010775321B2

(12) United States Patent
Weiss et al.

(10) Patent No.: US 10,775,321 B2
(45) Date of Patent: Sep. 15, 2020

(54) METHOD AND CALIBRATION CONFIGURATION FOR CALIBRATING A COORDINATE MEASURING MACHINE IRRADIATING MEASUREMENT OBJECTS WITH INVASIVE RADIATION

(71) Applicant: CARL ZEISS INDUSTRIELLE MESSTECHNIK GMBH, Oberkochen (DE)

(72) Inventors: Daniel Weiss, Essingen-Forst (DE); Wolfgang Kimmig, Aalen (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 6 days.

(21) Appl. No.: 16/212,955

(22) Filed: Dec. 7, 2018

(65) Prior Publication Data
US 2019/0178820 A1  Jun. 13, 2019

(30) Foreign Application Priority Data
Dec. 7, 2017 (DE) .................... 10 2017 222 151

(51) Int. Cl.
*G01N 23/046* (2018.01)
*G01B 15/00* (2006.01)
*G01B 21/04* (2006.01)

(52) U.S. Cl.
CPC ........... *G01N 23/046* (2013.01); *G01B 15/00* (2013.01); *G01B 21/042* (2013.01); *G01N 2223/303* (2013.01)

(58) Field of Classification Search
None
See application file for complete search history.

(56) References Cited

U.S. PATENT DOCUMENTS

| 7,967,507 B2 | 6/2011 | Levine et al. |
| 8,777,485 B2 | 7/2014 | Holt |
| 2014/0270059 A1 | 9/2014 | Suppes et al. |
| 2016/0370443 A1* | 12/2016 | Bao ...................... G01R 33/481 |

FOREIGN PATENT DOCUMENTS

| DE | 102006028452 A1 | 12/2007 |
| DE | 102011001746 A1 | 10/2012 |
| DE | 102016101005 A1 | 8/2016 |
| EP | 2779097 A1 | 9/2014 |
| WO | 2014122218 A2 | 8/2014 |

OTHER PUBLICATIONS

Neuser et al. "CT & Metrology Application of the VDI/VDE Guideline 2630 and Optimization of the System" DGZfP Annual Conference, Postdam May 27, 2014.
The Phantom Laboratory: Catphan® 500 and 600 Manual, Version 2015, Available online: https://www.phantomlab.com/s/Cataphan-500600-Manual.pdf.

\* cited by examiner

*Primary Examiner* — Hoon K Song
(74) *Attorney, Agent, or Firm* — Laurence A. Greenberg; Werner H. Stemer; Ralph E. Locher (57) ABSTRACT

A calibration configuration calibrates a coordinate measuring machine that is suitable to irradiate measurement objects with invasive radiation and to process corresponding radiographs of the measurement objects. The calibration configuration includes a plurality of calibration modules. Each calibration module includes a carrier and in each case a plurality of at least three calibration objects that are assigned to the carrier. The plurality of calibration objects are arranged along a longitudinal direction of the calibration module and attached to the carrier.

10 Claims, 3 Drawing Sheets

METHOD AND CALIBRATION CONFIGURATION FOR CALIBRATING A COORDINATE MEASURING MACHINE IRRADIATING MEASUREMENT OBJECTS WITH INVASIVE RADIATION

CROSS-REFERENCE TO RELATED APPLICATION

This application claims the priority, under 35 U.S.C. § 119, of German application DE 10 2017 222 151.8, filed Dec. 7, 2017; the prior application is herewith incorporated by reference in its entirety.

BACKGROUND OF THE INVENTION

Field of the Invention

The invention relates to a calibration arrangement for calibrating a coordinate measuring machine, which irradiates measurement objects with invasive radiation and processes corresponding radiographs of the measurement objects, in particular for calibrating an X-ray computed tomography scanner. The invention furthermore relates to a method for calibrating such a coordinate measuring machine and to a method for producing said calibration arrangement.

The method of computed tomography (CT) is known e.g. from published, non-prosecuted German patent application DE 10 2016 101 005 A1. For example, the measurement object to be examined is arranged on a rotary table between a radiation source and a radiation detector. By rotating the table, or in a different case by rotating the radiation source and the radiation detector around the measurement object, the measurement object is brought into various rotation angle positions relative to the radiation source, with the result that X-rays penetrate the measurement object from different directions. The X-rays passing through the measurement object are attenuated and the resulting irradiance distribution is detected by a detector, which produces corresponding projection images. By acquiring a multiplicity of e.g. several hundred to 1000 projection images in corresponding, e.g. equidistant, rotation angle positions and the application of known methods of tomographic reconstruction, a 3D image of the workpiece can be calculated. Aside from X-rays, other invasive electromagnetic radiation can also be used.

It is furthermore known to calibrate the coordinate measuring machine operating with invasive radiation, in particular a CT system. The calibration can serve for checking the function of the CT system. The calibration arrangement can also be used in particular to verify and/or validate the measurement accuracy of the CT coordinate measuring machine.

A technical regulation for the calibration of CT systems can be found e.g. in the VDI standard 2630 of the Association of German Engineers. During the calibration, arrangements are used which have a plurality of calibration objects, e.g. spherical objects, the relative positions of which (e.g. the sphere centers) are known or are subsequently ascertained and e.g. are/were measured by way of another coordinate measuring machine. To measure the positions of the calibration objects, e.g. tactile measurement technology can be applied.

In particular, the known relative positions of the calibration objects can be compared to corresponding relative positions, which were obtained through 3D reconstruction from the projection images. This makes possible, within the meaning of a calibration, a check of the function of the coordinate measuring machine to be calibrated (e.g. a check of the accuracy of the position determination).

A plurality of calibration objects can be attached to a common carrier. This makes it possible for the relative positions of the calibration objects to be measured (e.g. in tactile fashion) once or separately at relatively large time intervals and to be used in a plurality of calibration processes.

International patent publication WO 2014/122218 discloses an assembly kit for arranging various configurations of a calibration arrangement to evaluate the performance of an X-ray computed tomography instrument, wherein the assembly kit contains two or more interconnectable, stackable support plates, and each support plate has another surface and at least one spherical body connected to a surface of the support plate. For large measurement volumes, to completely fill the measurement volume, a very long spacer or a large number of support plates and spacers is required, as a result of which very high demands arise of the support plates and the spacers with respect to the stability during measurement. Furthermore, the calibration arrangement or individual support plates only have a limited suitability for rotation.

In measurements of a measurement object using a CT system, it is possible, comparably to the measurement with different measurement techniques, to minimize the influence of systematic errors of the CT system by appropriately selecting the position and/or size of the measurement object. In particular, the measurement object is arranged and/or oriented such that as great a proportion as possible of the measurement volume that is capturable by the CT system by way of the detector device thereof is filled thereby. If the measurement object and the radiation source are rotatable relative to one another, the proportion of the measurement volume that is filled by a non-cylindrical measurement object can be dependent on the rotational position. If the CT system is to be calibrated, similar applies to the calibration arrangement, which is to fill as great a proportion as possible, or a minimum extent, of the measurement volume in particular in different spatial directions.

Another disadvantage of known calibration arrangements is that the calibration objects of the calibration modules are freely accessible and can consequently be damaged upon touch or become displaced.

SUMMARY OF THE INVENTION

It is an object of the present invention to specify a calibration arrangement for calibrating a coordinate measuring machine, which is suitable for irradiating measurement objects with invasive radiation and to process corresponding radiographs of the measurement objects, a method for calibrating such a coordinate measuring machine, and a method for producing the calibration arrangement, which are to make possible calibration in the entire measurement volume or in a defined proportion of the measurement volume with little outlay.

Proceeding from the VDI standard 2630, it is advantageous for calibrating coordinate measuring machines operating with invasive radiation if calibration objects having a known pair-wise distance are arranged in each case in different directions. The distance of the calibration objects is understood to mean in particular the distance of marked points of the different calibration objects, for example the sphere centers of calibration spheres. According to VDI 2630, five different distances per direction are to be measured. In addition, calibration objects are to be arranged in a number of seven different spatial directions. This is attainable with a single calibration module, which has a plurality of calibration objects arranged one behind the other and is oriented successively in the different directions. However, the outlay of such a calibration is great, and the arrangement cannot be reproducibly produced, or can be produced only inaccurately reproducibly.

For this reason, it is proposed to use for the calibration a plurality of calibration modules, along the longitudinal axis of which at least three calibration objects are arranged in each case. By using a plurality of such calibration modules, it is possible to orient them advantageously, with respect to the utilization of the measurement volume, in a plurality of spatial directions and measure them at the same time. In this way, the requirement of VDI 2630 with respect to the measurement of a plurality of distances in seven different spatial directions can be achieved with the proposed calibration arrangement at least partially, i.e. with respect to a plurality of or all seven spatial directions, in a simple manner. The dimensions of the different calibration modules can be selected here in accordance with the dimensions of the measurement volume of the coordinate measuring machine to be calibrated, with the result that all of the measurement volume, or a predetermined proportion of it, is filled in different directions. Filling the measurement volume is understood to mean that the calibration objects of the same calibration module which are placed inside the measurement volume and are spaced apart the furthest from one another are placed at mutually opposite boundaries of the measurement volume. Opposite here refers to the longitudinal axis of the calibration module and does not need to mean that the calibration objects positioned at the mutually opposite boundaries of the measurement volume have a distance from one another that corresponds to a maximum width, a maximum length or a maximum diameter of the measurement volume. In a coordinate measuring machine, which produces a radiation cone of invasive radiation or a different radiation region with diverging edges, the measurement volume is determined in particular by the edges of the radiation region, if desired additionally with a movability of the radiation region, and/or by the boundaries of the radiation detector, if desired likewise additionally with a movability of the radiation detector.

In particular when more than two calibration objects of the same calibration module are arranged one behind the other along the respective longitudinal axis and this applies to a plurality of the calibration models, the calibration objects of the different calibration modules can be arranged one behind the other in different spatial directions. Arranging more than two calibration objects one behind the other has the advantage that the pair-wise distances of the calibration objects are determinable at least approximately along the same spatial direction. If, on the other hand, the calibration objects are not arranged one behind the other along the longitudinal axis, the joined sequence of the distance lines can resemble a zigzag profile.

In particular, the following is proposed: A calibration arrangement for calibrating a coordinate measuring machine that is suitable and in particular also configured to irradiate measurement objects with invasive radiation and to process corresponding radiographs of the measurement objects, wherein the calibration arrangement includes a plurality of calibration modules, wherein each calibration module includes a carrier and in each case a plurality of at least three calibration objects that are assigned to the carrier, wherein the plurality of calibration objects are arranged along a longitudinal direction of the calibration module and attached to the carrier.

In particular, the plurality of the calibration objects are distributed along the longitudinal direction of the calibration module such that the plurality of the calibration objects are arranged one behind the other or in a different manner at respectively different positions with respect to a longitudinal axis extending in the longitudinal direction of the calibration module. In the latter case, it is therefore possible to uniquely determine for each calibration object a position with respect to the longitudinal axis at which a marked point of the calibration object is located. If the marked point is not situated directly on the longitudinal axis, the position of the marked point with respect to the longitudinal axis is the position of the base point, located on the longitudinal axis, of a perpendicular to the longitudinal axis which extends through the marked point of the calibration object.

The plurality of calibration modules can at the same time be arranged in the measurement volume, and projection images of the plurality of the calibration modules or of the associated calibration objects can be acquired. This brings about a shortening of the overall measurement time period, because the plurality of the calibration modules (and preferably all calibration modules that are used in the calibration) are measured at the same time rather than one after the other. This is particularly advantageous in a calibration, because it is not possible for a temperature drift as compared to successive measurements of a plurality of individual calibration modules to occur. The comparability of the simultaneously ascertained measurement values of a plurality of calibration modules is thus reliably ensured by way of the calibration arrangement according to the invention. It is furthermore possible for a plurality of calibration modules to be arranged in the measurement volume such that it is possible for a greater or specified proportion of the measurement volume to be filled.

Furthermore, the following is proposed: A method for calibrating a coordinate measuring machine, which irradiates measurement objects with invasive radiation and processes corresponding radiographs of the measurement objects:

a) wherein a plurality of carriers, to which in each case a plurality of at least three calibration objects arranged on the carrier along a longitudinal direction of the calibration module is attached, are arranged as a calibration arrangement or as part of a calibration arrangement in a measurement volume of the coordinate measuring machine, b) wherein a plurality of radiographs of the calibration arrangement are acquired, and c) wherein the plurality of radiographs are used to calibrate the coordinate measuring machine.

In particular, the relative positions of the calibration objects relative to one another can be reconstructed from the radiographs, and the reconstructed relative positions can be compared to relative positions of the calibration objects which are available in the form of comparative data.

Moreover, the following is proposed: A method for producing a calibration arrangement, which serves for calibrating a coordinate measuring machine, which irradiates measurement objects with invasive radiation and processes corresponding radiographs of the measurement objects, wherein attached to a plurality of carriers are in each case a plurality of at least three calibration objects arranged on the carrier along a longitudinal direction of the calibration module, such that the plurality of at least three calibration objects and the carrier are assigned to one another.

Refinements of the methods can be gathered from the description of refinements of the calibration arrangement.

Typically, calibration objects have in each case a marked point, such as the center of the calibration sphere, the position of which is determined by the coordinate measuring machine, which irradiates measurement objects with invasive radiation, and is also known for the purposes of calibration and/or is determined by another coordinate measuring machine (e.g. a tactile probing device). Aside from calibration spheres, differently shaped calibration objects can also be used, however. For example, a calibration object can have the shape of a cuboid, and as a result the six corner points of the cuboid are defined as the marked points. Where this description mentions that the calibration objects are arranged one behind the other in the longitudinal direction of the calibration module, or where it mentions that the calibration objects are arranged in a different manner or in a specific manner, this can apply in particular to in each case at least one marked point of the calibration objects. In the case of calibration spheres, in particular the centers of the calibration spheres are arranged one behind the other in the longitudinal direction of the calibration module.

In a development, the plurality of the assigned calibration objects are arranged one behind the other on a straight line with respect to at least one of the calibration modules. In the case of calibration spheres, the centers of the calibration spheres are thus arranged one behind the other on the straight line.

It is of course possible for slight deviations e.g. in the range of a few micrometers of the arrangement of the calibration objects on the straight line to occur. Nevertheless, the distances of the calibration object and in particular the distances of the marked points of different calibration objects can be ascertained in a simple manner. The direction of the straight line then corresponds to one of the spatial directions in which distances of calibration objects (i.e. in particular distances of the marked points) are to be determined in accordance with VDI 2630. But even when the calibration objects are not arranged one behind the other on a straight line, but have e.g. in each case a significant lateral offset with respect to a straight line, specifically in different directions, yet are arranged one behind the other in the longitudinal direction (i.e. the next calibration object covers the view of a calibration object to the next but one calibration object in the sequence of the calibration objects which are arranged one behind the other), it is still possible for the pair-wise distances of the calibration objects of the same calibration module to be uniquely determined in a simple manner. Even when the calibration objects are attached to the carrier along the longitudinal axis that is defined e.g. by the rod-type or rectilinearly tubular carrier, but are not arranged one behind the other within the meaning of covering the respective next calibration object, it is possible for the pair-wise distances of the calibration objects to be determined in a simple manner with respect to the longitudinal axis and consequently the corresponding spatial direction.

The materials of the carriers are preferably materials having a low coefficient of thermal expansion, such as a ceramic material or a fiber-reinforced plastic. Silicon dioxide is furthermore suitable, inter alia.

At least one of the carriers, and in particular all carriers, the calibration modules can have a rod-type or tubular shape. As a result, the material used can be reduced, which means costs can be saved. Other shapes of the carriers of the calibration modules are conceivable. For example, the mutually neighboring calibration objects of the same calibration module can be connected together in each case by a rod or a straight tube or by any other material bridge of desired shape. The use of a single rod or straight tube in the respective calibration module, however, offers the advantage that the carriers extend along a longitudinal axis e.g. over the entire length of the calibration module, and the plurality of the calibration objects can therefore be arranged along the longitudinal direction in particular one behind the other in a simple manner. Rods and straight tubes having calibration objects which are directly attached thereto also take up little space in the directions transversely to the longitudinal axis. Even in the case of calibration modules with carriers of a different type it is possible for at least three and in particular all of the calibration bodies of the calibration module to be arranged one behind the other along the longitudinal axis.

The calibration objects are in particular spherical objects, i.e. calibration spheres. Other shapes of the calibration objects are conceivable. The selection of the color, quality and hardness of the calibration objects is likewise not limited. The material for the calibration objects is preferably selected from the group including corundum and ceramic.

In particular, a significant difference in absorption of the invasive radiation can exist between the material of the calibration objects and the carrier. In particular, the absorption by the material of the calibration object is the greater of the two. The difference in absorption between carrier and object, however, is not limited to a specific value or percentage. However, the calibration objects can be reliably ascertained from the reconstruction even if the absorption by the materials of carrier and calibration objects is the same or virtually the same.

The calibration objects are preferably made from ruby. Ruby is hard, dimensionally stable and can be synthetically produced in an economic fashion. Spheres made of ruby are known as probe elements of tactile probes for coordinate measuring machines. Ruby and quartz glass can additionally be adhesively bonded together permanently in a simple manner.

Independently of the materials, the calibration objects can be attached to the carrier by a material bond, e.g. by adhesive bonding, with a form fit, e.g. by embedding the calibration object in the carrier, and/or with a force fit, e.g. by screw-connection.

One embodiment makes provision with respect to each of the calibration modules for the calibration objects which are attached to the carrier with the furthest mutual distance to define a longitudinal extent of the plurality of the calibration objects in the longitudinal direction, wherein in respect of at least two of the calibration modules the longitudinal extent of the plurality of the calibration objects varies.

Due to the different longitudinal extent, it is possible, with a corresponding different orientation of the calibration modules, for the calibration objects to fill all of the measurement volume, or fill a large proportion of e.g. 80% or more of the measurement volume, in the different spatial directions (e.g. the spatial directions required by the VDI 2630).

In an embodiment, at least two carriers have different dimensions, in particular a different length in the longitudinal direction. Due to the different lengths of the carriers, it is possible to create attachment features for the calibration objects e.g. for two spatial directions of different lengths through the measurement volume to fill a large proportion of the measurement volume in the respective spatial direction.

Another embodiment makes provision for the longitudinal axes (and in particular the above-mentioned straight lines, on which the calibration objects are arranged) of at least one pair of the calibration modules to intersect or to be skewed. As a result, it is possible for the calibration modules to be oriented in the measurement space such that a large proportion of the measurement volume is filled in different spatial directions.

According to a further embodiment, the calibration arrangement includes a holder, which retains and supports a plurality of the calibration modules. Provided in this way is a calibration arrangement, in which the calibration objects of a plurality of calibration modules are arranged in a defined relative position with respect to one another. Furthermore, it is possible on account of the holder to enhance the dimensional stability of the arrangement and to protect the calibration modules against external influences. If desired, the connection of holder and calibration modules can be releasable, such that the arrangement may be disassembled and consequently is easier to transport and store. In this case, it is preferred that the connections are such that they are reproducibly restorable with respect to the relative positions of the plurality of calibration modules and of the holder.

The holder preferably has a cylindrical shape, with the result that it is placeable e.g. on an object table of a CT system with the cylindrical axis thereof being coaxial to a rotation axis of the object table. Alternatively or additionally, all calibration objects of the arrangement are situated within the cylinder surface that is defined by the outer surface of the cylinder. A cylindrical shape is understood here to mean that the holder forms a hollow cylinder, with at least parts of the calibration modules being placeable in the hollow space thereof. Other shapes of holder, in particular different hollow bodies, for receiving at least parts of the modules are possible, however. The material of the holder can be identical to that of the carriers to avoid thermal influences, but can also differ in order to reduce costs. For example, polymethyl methacrylate is well suited, because it is cost-effective. The relatively high coefficient of thermal expansion of polymethyl methacrylate, as compared to quartz as a material of the carrier, is not detrimental, because the holder serves merely for positioning the calibration modules during the measurement and does not influence the relative position between the calibration objects of the same calibration module. This relative position is influenced only by the material of the carrier.

A preferred embodiment of the calibration arrangement includes seven calibration modules. Preferably, each of the longitudinal axes of the calibration modules is aligned in one of the seven different spatial directions required by VDI 2630. When a holder is present, each calibration module is preferably individually connected to the holder. However, it is also possible for a plurality of calibration modules to be connected to one another. For example, a calibration module could have no connection to the holder, but only a connection to one or two other calibration module(s) which is/are connected to the holder.

By using the holder, the calibration modules overall are supported at a plurality of holding points, as a result of which the number of holding points is increased in comparison with a calibration arrangement which has calibration modules that are interconnected, with the result that the stability of the arrangement overall is improved.

In accordance with an embodiment, the connections between the calibration modules and the holder are such that each module is connectable to the holder with its longitudinal axis only in a single spatial direction with respect to the holder. For example, each connection can have a corresponding configuration, and/or two spaced-apart connection regions on the holder define the spatial direction. As a result, no expert knowledge is necessary to build the calibration arrangement.

In an embodiment, a plurality of the calibration modules has two attachment regions which are spaced apart from one another in the direction of the longitudinal axis and by way of which the respective calibration module is attached to the holder. By using two attachment regions, the stability of the positioning of the calibration modules is significantly increased and, as has been described above with respect to the connection regions, the spatial direction of the longitudinal axis of the module can be specified.

In a further embodiment, at least one of the calibration modules has a protective cover which encloses the plurality of the calibration objects that are assigned to the carrier and e.g. are fixed to the carrier. Alternatively, a protective cover may be present for each calibration object or for a plurality of, but not all, calibration objects.

The material of the protective cover can be the same material as that of the carrier, e.g. quartz glass or a cost-effective material, e.g. polymethyl methacrylate. Ideally, the protective cover is made from polymethyl methacrylate. Due to the protective cover, a mechanical protection against external forces and soiling can be provided.

In a development, the protective cover forms the attachment region and in particular the two attachment regions via which the calibration module is connected to the holder. But even when no common holder for a plurality of calibration modules is present, it is possible for a protective cover to be provided for at least one calibration module.

Furthermore, the calibration modules are not limited to the use in combination with a specific holder. For example, the same calibration modules can be used on different holders. For example, the calibration modules can be connected to different cylindrical holders at opposite end sections. The diameters and/or heights of the cylinders can differ. In each case, it is possible on account of differently placed connection regions for the longitudinal axes of the modules to be aligned in mutually different spatial directions by the different holders. Consequently, it is possible for example for one holder to be provided for each measurement volume of a plurality of different CT coordinate measuring machines. After attachment of the calibration modules, a large proportion of the measurement volume can be filled.

Other features which are considered as characteristic for the invention are set forth in the appended claims.

Although the invention is illustrated and described herein as embodied in a calibration of a coordinate measuring machine irradiating measurement objects with invasive radiation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
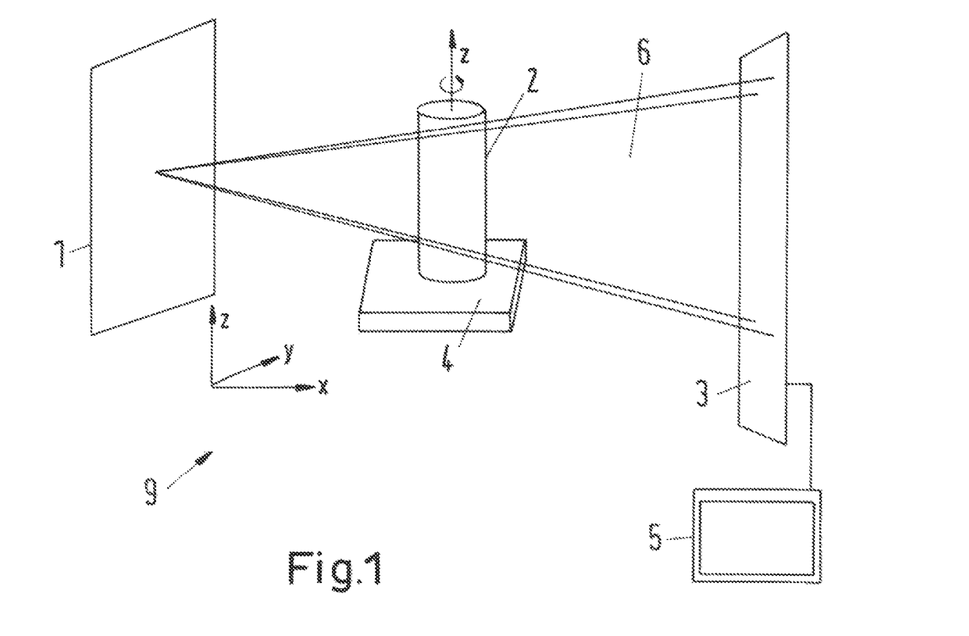
FIG. 1 is an illustration of a measurement arrangement with an X-ray source, a calibration arrangement, a detector, and an evaluation unit according to the invention.

Referring now to the figures of the drawings in detail and first, particularly to FIG. 1 thereof, there is shown a measurement arrangement having a CT coordinate measuring machine 9 and having a calibration arrangement 2, which is arranged between a radiation source 1 and a detector 3 of the CT coordinate measuring machine 9 on an object table 4 of the coordinate measuring machine 9. The detector 3 is connected to an evaluation unit 5 of the coordinate measuring machine 9. Schematically illustrated is a Cartesian coordinate system x, y, z. The x-axis extends from the radiation source 1 to the detector 3. The detector 3 extends in the direction of the y-axis and of the z-axis. The object table 4 is rotatable about an axis of rotation which extends in the direction of the z-axis. The radiation source 1 is any desired X-ray radiation source.

During the calibration operation of the measurement arrangement, the X-rays coming from the radiation source 1 travel to the calibration arrangement 2, pass through the latter, wherein they are attenuated by the material thereof, and are incident on the detector 3, which produces a projection image of the calibration arrangement 2, which is transmitted to the evaluation unit 5. The signals received in the detector are passed on to the evaluation unit 5, e.g. a computer, for evaluation. Next, the calibration arrangement 2 positioned on the rotary object table 4 is rotated about the z-axis by a rotation angle, and another projection image is acquired by the detector 3, and the image is transmitted to the evaluation unit 5.

By repeating this procedure, a multiplicity of projection images of the calibration arrangement 2 are obtained, wherein the calibration arrangement 2 is irradiated in different directions during the acquisition of the projection images.

The evaluation unit 5 then reconstructs the positions of the calibration objects in the calibration arrangement, such that the positions, e.g. the centers of calibration spheres, are available in a three-dimensional coordinate system of the calibration arrangement 2. The positions can be used in a manner known per se for calibrating the measurement arrangement.

Numerous variants of the use of a calibration arrangement are possible. For example, the irradiation of the calibration arrangement in different directions can be achieved not by rotation of an object table, but rather by rotating the radiation source and the detector around the calibration arrangement.

The distance of the calibration arrangement 2 from the radiation source 1 is an example and can be selected to be greater or less. The distance of the calibration arrangement 2 is advantageously selected such that the external edges of the calibration arrangement 2 coincide with the edges of the measurement volume 6 or are arranged at a slight distance from the respective edge of the measurement volume 6, such that all calibration objects are arranged within the measurement volume 6. As a result, calibration objects can be distributed over the entire measurement volume 6, and the images thereof are therefore also located close to the edges of at least some of the projection images. This makes possible a calibration over the entire measurement volume 6.

Figure 2:
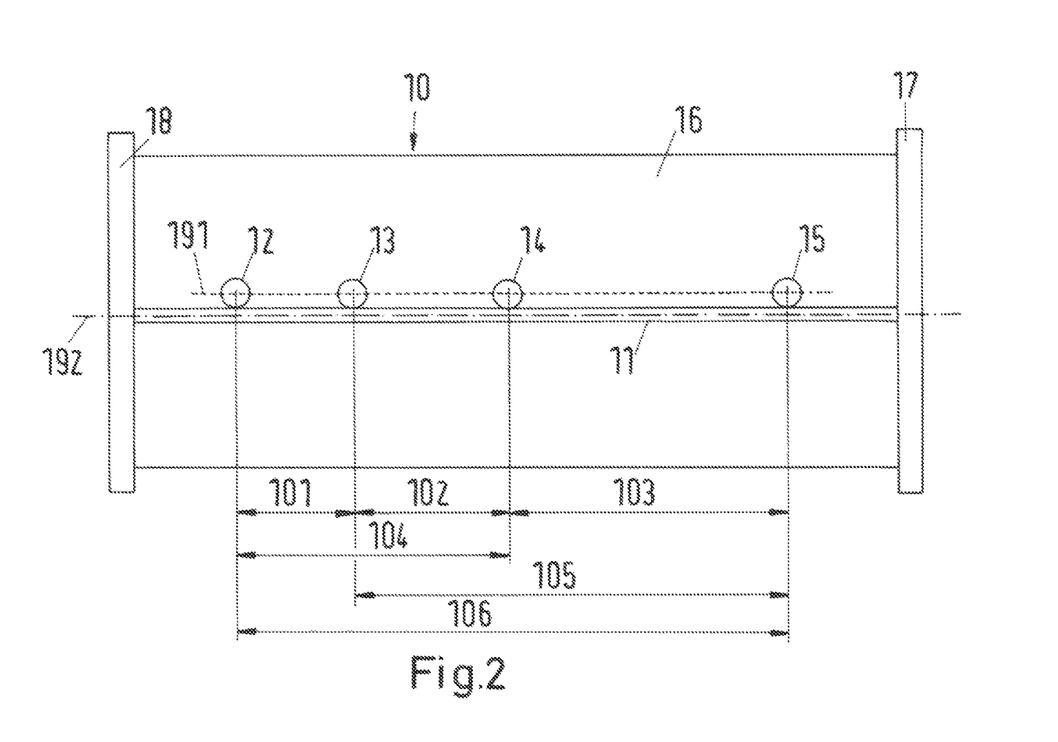
FIG. 2 is a diagrammatic, side view of a calibration module with a rod-type carrier, arranged on which on a straight line one behind the other are calibration objects, and with a protective cover.

FIG. 2 shows a preferred embodiment of a calibration module 10. The calibration module 10 has four calibration objects 12, 13, 14, 15, in the present case calibration spheres. However, the number can alternatively be merely three or more than four. The calibration objects 12, 13, 14, 15 are attached to a rod-type carrier 11 and are arranged on a straight line 191 one behind the other. The centers of the calibration spheres are all situated on the straight line 191. The straight line 191 at the same time defines the longitudinal axis of the calibration module. The longitudinal axis 192 of the rod-type carrier 11 extends parallel with respect to the straight line 191. The calibration module 10 additionally has a protective cover 16, which forms in particular two attachment regions 17, 18 in the opposite end regions of the protective cover, by way of which the protective cover 16 is connectable to a holder, as will be described below e.g. with reference to FIG. 4. Alternatively, an attachment region, or the two attachment regions, can be situated at different positions with respect to the longitudinal axis of the calibration module 10. In the illustrated example, the attachment regions 17, 18 are situated at ends of the protective cover 16 which are mutually opposite in the direction of a longitudinal axis 192, in particular at side walls of the protective cover 16 which are arranged there.

The protective cover 16 is a cylindrical protective cover 16 with protruding attachment regions 17, 18.

The distances between neighboring calibration objects 12, 13, 14, 15 vary along the longitudinal axis 192. In the exemplary embodiment illustrated in FIG. 2, a distance 101 between the calibration objects 12 and 13 is shorter than the distance 102 between the calibration objects 13 and 14 or the distance 103 between the calibration objects 14 and 15. In total, six different distances 101, 102, 103, 104, 105 and 106 between the calibration objects are capturable in the calibration module 10, which can form a basis for a calibration.

In the embodiment of the calibration module 10 in FIG. 2, the protective cover 16 encloses the entire carrier 11 and all calibration objects 12, 13, 14, 15. At the ends of the calibration module 10, the protective cover 16 advantageously transitions into the attachment regions 17, 18. As is true in all cases of a rod-type carrier, it is preferred that the protective cover 16 is connected (in particular exclusively) to the carrier 11 at the ends thereof. However, it is also possible that, in addition to the connection at the opposite ends of the carrier 11, at least one additional connection between the carrier 11 and the protective cover 16 is present at a different longitudinal position of the calibration module 10.

Figures 3, 4:
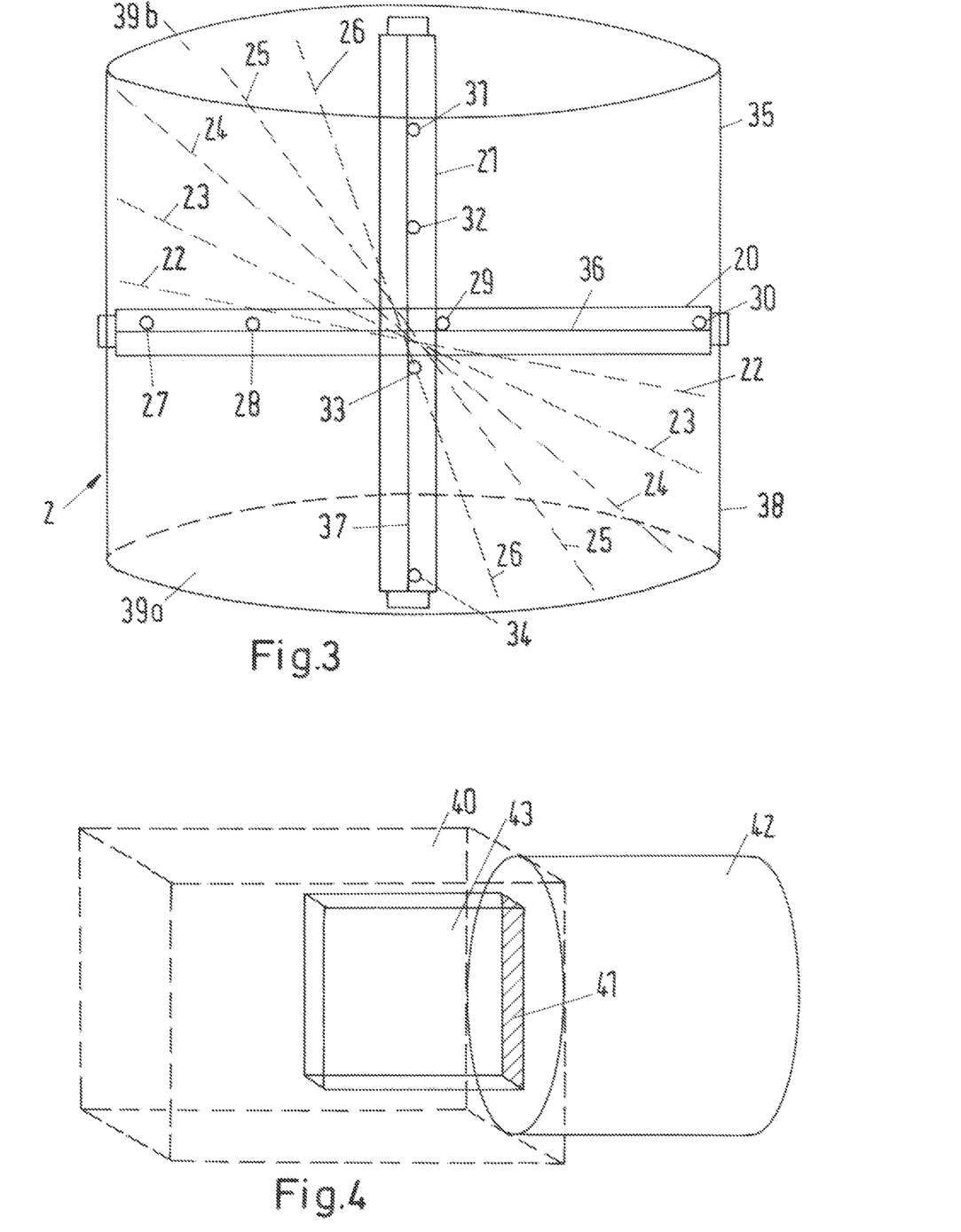
FIG. 3 is a side view of an exemplary embodiment of the calibration arrangement, e.g. of the calibration arrangement in accordance with FIG. 1.
FIG. 4 is a perspective view of an attachment device for use at a holder for a plurality of calibration modules and a corresponding attachment region at a calibration module.

FIG. 3 shows a particularly preferred embodiment of the calibration arrangement 2, which has seven calibration modules 20, 21, 22, 23, 24, 25, 26. The calibration module 20 includes a rod-type carrier 36 with four calibration objects 27, 28, 29, 30, and the calibration module 21 includes a rod-type carrier 37 with four calibration objects 31, 32, 33, 34. The calibration arrangement 2 furthermore includes a holder 35. The calibration objects 27, 28, 29, 30 are arranged on the carrier 36, and the calibration objects 31, 32, 33, 34 are arranged on the carrier 37, with the carriers 36 and 37 defining the respective longitudinal axis and thus the respective longitudinal direction of the calibration modules 20 and 21.

Out of the seven calibration modules 20, 21, 22, 23, 24, 25, 26, two calibration modules 20, 21 are illustrated in detail in FIG. 3, while the other calibration modules 22, 23, 24, 25, 26 are indicated in dashed lines. They in particular likewise include a rod-type carrier and in each case four assigned calibration objects attached to the carrier. The respectively dashed line, for example, represents the carrier on which the calibration objects of the respective calibration module are arranged. Each calibration module 20, 21, 22, 23, 24, 25 and 26 preferably has, at its ends which are opposite in the longitudinal direction, a respective attachment region that is connected to the holder 35, whereby the respective calibration module is fixed.

In FIG. 1, a Cartesian coordinate system is drawn to describe the positions of the calibration modules in space, with the z-axis being identical to the axis of rotation of the calibration arrangement 2 or being parallel thereto, and with the x-axis extending perpendicularly to the detector and connecting the radiation source in particular to a center of the detector in the rest position.

If the calibration arrangement 2, described with reference to FIG. 3, is used as a calibration arrangement for calibrating the CT coordinate measuring machine 9 illustrated in FIG. 1, the calibration module 20 is oriented by way of its longitudinal axis in particular in each rotational position of the rotary table perpendicularly to the z-axis. In this case, the calibration module 21 is oriented by way of its longitudinal axis parallel or coaxially with respect to the z-axis. By rotating the object table 4, the longitudinal axis of each of the 5 other calibration modules describes a tumbling motion around the axis of rotation, although the longitudinal axis does not intersect the axis of rotation, because this is where the calibration module 21 is situated.

A holder 35 illustrated in FIG. 3 is cylindrical. It has a cylinder wall 38, a circular bottom 39a, and a likewise circular top 39b. The calibration modules 20, 22, 23, 24, 25, 26 are connected in each case at their opposite ends to mutually opposite regions of the cylinder wall 38. The mutually opposite regions in this exemplary embodiment are not mutually opposite with respect to the axis of rotational symmetry of the holder 35, because this is where the calibration module 21 is situated. The calibration module 21 is connected at its opposite ends to the bottom 39a and the top 39b. In deviation from the illustrated embodiment, the calibration modules 20, 21, 22, 23, 24, 25, 26 can be attached to attachment regions of the holder 35 which are differently positioned. Used in this case are in particular calibration modules having a different longitudinal extent with respect to the respective longitudinal axis thereof. It is in particular possible for none of the calibration modules of the calibration arrangement to be attached to a top or bottom of the holder. A top and a bottom can be dispensed with in this case.

The lengths of the calibration modules of the calibration arrangement 2 are selected in terms of their respective longitudinal direction such that the mutually opposite ends of the calibration modules are attached in each case to the cylinder wall 38 of the holder 35. The only exception is the calibration module 21, since the longitudinal axis thereof extends in the z-direction and is thus parallel or coaxial with respect to the cylinder axis of the holder 35.

Variants of the calibration arrangement described in FIG. 3 with more or fewer calibration modules, more or fewer calibration objects per calibration module, and different orientations of the longitudinal axis of the calibration modules are possible. For example, likewise in the case of seven calibration modules, it is possible for none of the calibration modules to be arranged coaxially with respect to the central cylinder axis of the cylindrical holder. In this case it is possible that at least one longitudinal axis of one of the other calibration modules intersects the cylinder axis. Preferably, the longitudinal extent, defined by the greatest distance between a pair of calibration objects of the same calibration module, of the plurality of calibration objects differs in size in the case of at least two of the calibration objects, and in particular differs in size in the case of at least six of the seven calibration modules of the calibration arrangement.

In a preferred embodiment of the calibration arrangement according to the invention, as is illustrated for example in FIG. 3, all calibration modules have a different inclination angle of their longitudinal axis in relation to the horizontal. In particular, the inclination angles can be distributed uniformly over the 90° region to the vertical. In the case of seven calibration modules, each of the inclination angles differs by 15° from the inclination angle of at least one other longitudinal axis of one of the modules. The inclination angles are therefore 0°, 15°, 30°, 45°, 60°, 75° and 90°.

Alternatively or additionally, the longitudinal axes of the calibration modules can all extend in different directions, as viewed in a plan view from above (in the z-direction) of the calibration arrangement, i.e. projections of the longitudinal axis onto the x-y plane in the case of FIG. 1 are viewed. The direction of the projection of the longitudinal axis of any calibration module which may be present, as in the exemplary embodiment of FIG. 3, cannot be determined here and is therefore not taken into account. The determinable directions of the projections are (for example uniform) over an angle region of 0-180° (azimuth angle of the projections of the longitudinal axes, which is obtained from an imaginary displacement of the projections of the longitudinal axes such that all projections of the longitudinal axes intersect in one point).

By selecting different inclination angles and/or azimuth angles (as described) of the longitudinal axis of the calibration modules, the positions of the calibration objects can be distributed uniformly over the volume region swept by the calibration arrangement by way of rotation about the rotational axis. If this volume region fills all of, or fills a significant proportion of, the measurement volume of the CT coordinate measuring machine, the calibration objects will also be distributed very well over the measurement volume. In any larger partial regions of the volume region in which no calibration objects are situated in a specific rotational position of the calibration arrangement, calibration objects are then introduced by rotating the calibration arrangement about the rotational axis.

FIG. 4 shows an attachment device for use on a holder, for example the holder 35 illustrated in FIG. 3. The outlines of an attachment region 40 of the holder are illustrated in FIG. 4 in dashed lines. The attachment region 40 in this exemplary embodiment has the shape of a cuboid. The attachment region can be embodied, for example, as a structural element separate from the holder and be introduced, for example in accordance with the embodiment in FIG. 3, into the cylinder wall 38 of the holder 35 and be permanently attached thereto.

In addition, FIG. 4 illustrates an end section 42 of a calibration module. This is a cylindrical end section in the illustrated exemplary embodiment. For example, the end section can be a region of a protective cover similar to the protective cover 16 that is illustrated in FIG. 2, but, in contrast to the protective cover 16 in FIG. 2, the end section 42 in FIG. 4 does not have a greater outer circumference than the central region of the protective cover.

Furthermore, a cuboid protrusion 43 is arranged at the front side of the end section 42. It is connected, for example adhesively bonded, to the front face of the end section 42 in a rectangular region 41 illustrated in FIG. 4 by hatching. The protrusion 43 is received in a correspondingly shaped cutout of the attachment region 40 without play, or with little play, such that any rotation about the longitudinal axis of the calibration module which is relevant for the positioning of the calibration module on the holder cannot occur. In particular, all calibration modules of the calibration arrangement can be connected in a form-fitting manner to a common holder by way of an attachment as illustrated in FIG. 4.

Figure 5:
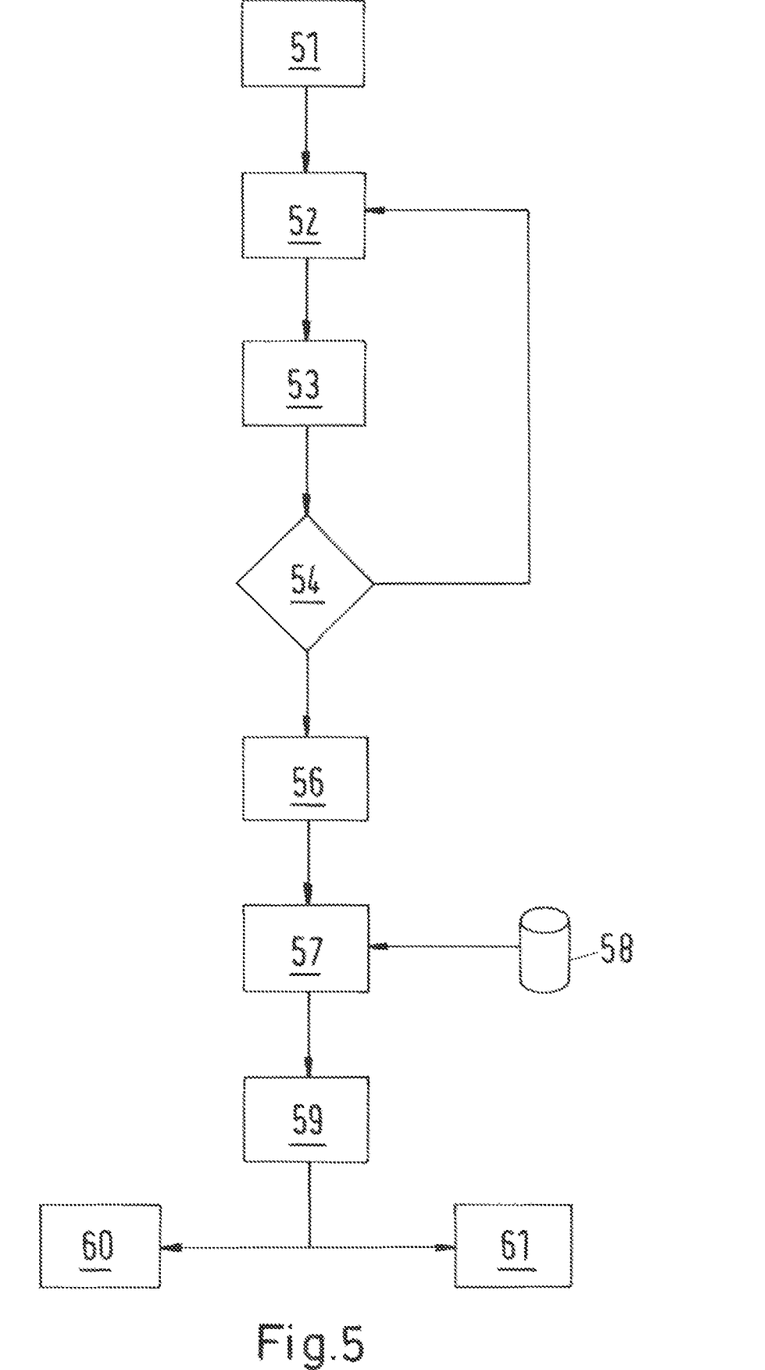
FIG. 5 is a flowchart of a method for calibration.

FIG. 5 shows a flowchart for illustrating an exemplary embodiment of the method according to the invention for calibrating a coordinate measuring machine, which irradiates measurement objects with invasive radiation and processes corresponding radiographs of the measurement objects. The method begins at a first method step 51 with the placement of the calibration arrangement within the measurement volume of a CT coordinate measuring machine.

In a second method step 52, which follows the first method step 51, a relative position of calibration arrangement, radiation source (for example the radiation source 1 illustrated in FIG. 1) and detector (for example the detector 3 illustrated in FIG. 1) is set. Here, the calibration arrangement can be in particular displaced in all spatial directions and/or be rotated about at least one spatial direction. The calibration arrangement is hereby positioned such, for example, that a change in the relative positions with respect to the radiation source and the detector is possible in a simple manner in the subsequent operation, for example by rotating the calibration arrangement that is arranged on an object table about a rotational axis of the object table.

In a third method step 53, which follows the second method step 52, a first radiograph of the calibration arrangement in the previously set, first relative position of calibration arrangement, radiation source and detector is acquired.

In the subsequent method step 54, a decision is made as to whether the number and/or quality of radiographs acquired is/are sufficient for a calibration. In particular, this will not yet be the case after the acquisition of the first radiograph. For example, a number of radiographs is specified that must be acquired in each case in a different relative position of calibration arrangement, radiation source and detector before a reconstruction of the calibration arrangement and calibration take place. As a consequence, there is thus a criterion relating to the question as to whether a number and/or quality of radiographs sufficient for the calibration is/are available. If the criterion is fulfilled, the method is continued at the method step 56. If not, the method steps 52 and 53 are performed again, with a setting of a changed relative position of the calibration arrangement in step 52 and an acquisition of a radiograph in step 53.

If the decision in step 54 is that the criterion has been fulfilled, then, in method step 56, a 3D reconstruction of the calibration arrangement is calculated, for example by the evaluation unit 5 illustrated in FIG. 1, which may be a correspondingly configured computer with access to corresponding data storage devices for storing in particular the radiographs.

In the subsequent method step 57, reference data relating to the distances and/or positions of calibration objects of the calibration arrangement are read from a data memory 58, which have been determined e.g. by tactile measurement of the individual calibration modules. In the subsequent method step 59, the reference data, or data derived therefrom, are compared to corresponding data from the 3D reconstruction, and a decision is made as to whether an accuracy of the determination of positions and/or distances from the 3D reconstruction is sufficient (for example fulfils a specified criterion with respect to accuracy). If this is the case, the actual operation of the CT coordinate measuring machine can be continued, if desired, in step 60, in which for example a measurement object from industrial production is measured, rather than the calibration arrangement. However, if this is not the case, an analysis can be performed in the optional subsequent step 61 as to why the accuracy is not sufficient.

Alternatively or additionally to the decision as to whether the accuracy is sufficient, another method partial step relating to a calibration of the CT coordinate measuring machine can be performed. For example, an imaging scale of the detector of the coordinate measuring machine can be ascertained.

With reference back to FIG. 3, the calibration arrangement 2 illustrated therein can be produced in particular first by providing the holder 35 and then by attaching, for example, for each calibration module an attachment region 40 according to FIG. 4 to the holder 35. Subsequently, the calibration modules can be connected to the holder 35 at the attachment regions 40 which have already been attached to the holder 35. At the same time or afterward, a second attachment region 40 for each of the calibration modules can be attached to the holder 35. In particular, it is possible that the second attachment region 40 is connected first to the calibration module, and the calibration module including the second attachment region 40 is then connected to the first attachment region 40, which has already been attached to the holder 35. It is furthermore also possible for the second attachment regions to have a different configuration than that illustrated in FIG. 4. This is based on the idea that, for fixing the rotational position of the calibration module about its longitudinal axis, it is sufficient if one of the attachment regions has means that fix the calibration module in this sense.

The invention claimed is:

1. A calibration configuration for calibrating a coordinate measuring machine suitable for irradiating measurement objects with invasive radiation and to process corresponding radiographs of the measurement objects, the calibration configuration comprising:
   a plurality of calibration modules each having a carrier and a plurality of at least three calibration objects assigned to said carrier, said plurality of at least three calibration objects are disposed along a longitudinal direction of a respective one of said calibration modules and attached to said carrier, wherein with respect to each of said calibration modules, said calibration objects which are attached to said carrier with a furthest mutual distance define a longitudinal extent of said plurality of at least three calibration objects in the longitudinal direction, and wherein in respect of at least two of said calibration modules the longitudinal extent of said plurality of calibration objects varies.

2. The calibration configuration according to claim 1, wherein said plurality of at least three calibration objects are disposed one behind another on a straight line with respect to at least one of said calibration modules.

3. The calibration configuration according to claim 1, wherein longitudinal axes of at least one pair of said calibration modules intersect or are skewed.

4. The calibration configuration according to claim 1, further comprising a holder which retains and supports said plurality of calibration modules.

5. The calibration configuration according to claim 4, wherein said plurality of calibration modules, which are retained and supported by said holder, in each case have two attachment regions, which are spaced apart from one another in a direction of a longitudinal axis and by way of which said respective calibration module is attached to said holder.

6. The calibration configuration according to claim 5, wherein at least one of said calibration modules has a protective cover that encloses said plurality of at least three calibration objects assigned to said carrier.

7. The calibration configuration according to claim 6, wherein said protective cover has said two attachment regions.

8. A method for calibrating a coordinate measuring machine, which irradiates measurement objects with invasive radiation and processes corresponding radiographs of the measurement objects, which comprises the steps of:

providing a plurality of carriers, to which in each case a plurality of at least three calibration objects disposed along a longitudinal direction of a calibration module are attached, the plurality of carriers are disposed as a calibration configuration or as part of the calibration configuration in a measurement volume of the coordinate measuring machine, wherein with respect to each of the carriers, the calibration objects which are attached to a carrier with a furthest mutual distance define a longitudinal extent of the plurality of at least three calibration objects in the longitudinal direction, and wherein in respect of at least two of the carriers the longitudinal extent of the plurality of calibration objects varies;

acquiring a plurality of radiographs of the calibration configuration; and using the plurality of radiographs to calibrate the coordinate measuring machine.

9. The method according to claim 8, which further comprises:

reconstructing relative positions of the plurality of at least three calibration objects relative to one another from the radiographs; and comparing reconstructed relative positions to relative positions of the plurality of at least three calibration objects which are available as comparative data.

10. A method for producing a calibration configuration, which serves for calibrating a coordinate measuring machine, which irradiates measurement objects with invasive radiation and processes corresponding radiographs of the measurement objects, which comprises the steps of:

attaching to a plurality of carriers in each case a plurality of at least three calibration objects disposed on a respective one of the carriers along a longitudinal direction of a calibration module, such that the plurality of at least three calibration objects and the respective carrier are assigned to one another, wherein with respect to each of the carriers, the calibration objects which are attached to the carrier with a furthest mutual distance define a longitudinal extent of the plurality of at least three calibration objects in the longitudinal direction, and wherein in respect of at least two of the carriers the longitudinal extent of the plurality of calibration objects varies.

* * * * *